United States Patent [19]
Collins

[11] 3,950,561
[45] Apr. 13, 1976

[54] SHORTENING CHIP MANUFACTURE

[75] Inventor: Donald M. Collins, Louisville, Ky.

[73] Assignee: The Pillsbury Company, Minneapolis, Minn.

[22] Filed: Jan. 28, 1975

[21] Appl. No.: 544,734

[52] U.S. Cl. ................. 426/417; 426/515; 426/518
[51] Int. Cl.² ........................................... A23D 5/00
[58] Field of Search ........... 426/518, 515, 517, 455, 426/417, 337, 338, 339, 811, 520, 327, 530, 603

[56] References Cited
UNITED STATES PATENTS
2,412,203  12/1946  Brunkhurst ........................ 426/417

OTHER PUBLICATIONS
McDowell, "Buttermarket's Manual", Wellington, New Zealand University Press (1953).
Andersen, "Margarine", New York, Academic Press Inc. Pub., (1954).

Primary Examiner—S. Leon Bashore
Assistant Examiner—Kenneth M. Schor
Attorney, Agent, or Firm—James V. Harmon; Michael D. Ellwein

[57] ABSTRACT

Shortening chips composed, for example, of lard or hydrogenated vegetable oil are prepared by continuously depositing melted shortening on a moving endless chilling surface which is held at a temperature sufficiently low to congeal the shortening as a film on the chilling surface. After the shortening has congealed, it is removed continuously. At a suitable location between the removal point and the point at which the shortening is applied, water is applied to the surface of the chilling element to form a film which as the chilling element advances becomes interposed between the freshly applied shortening and the chilling surface.

8 Claims, 4 Drawing Figures

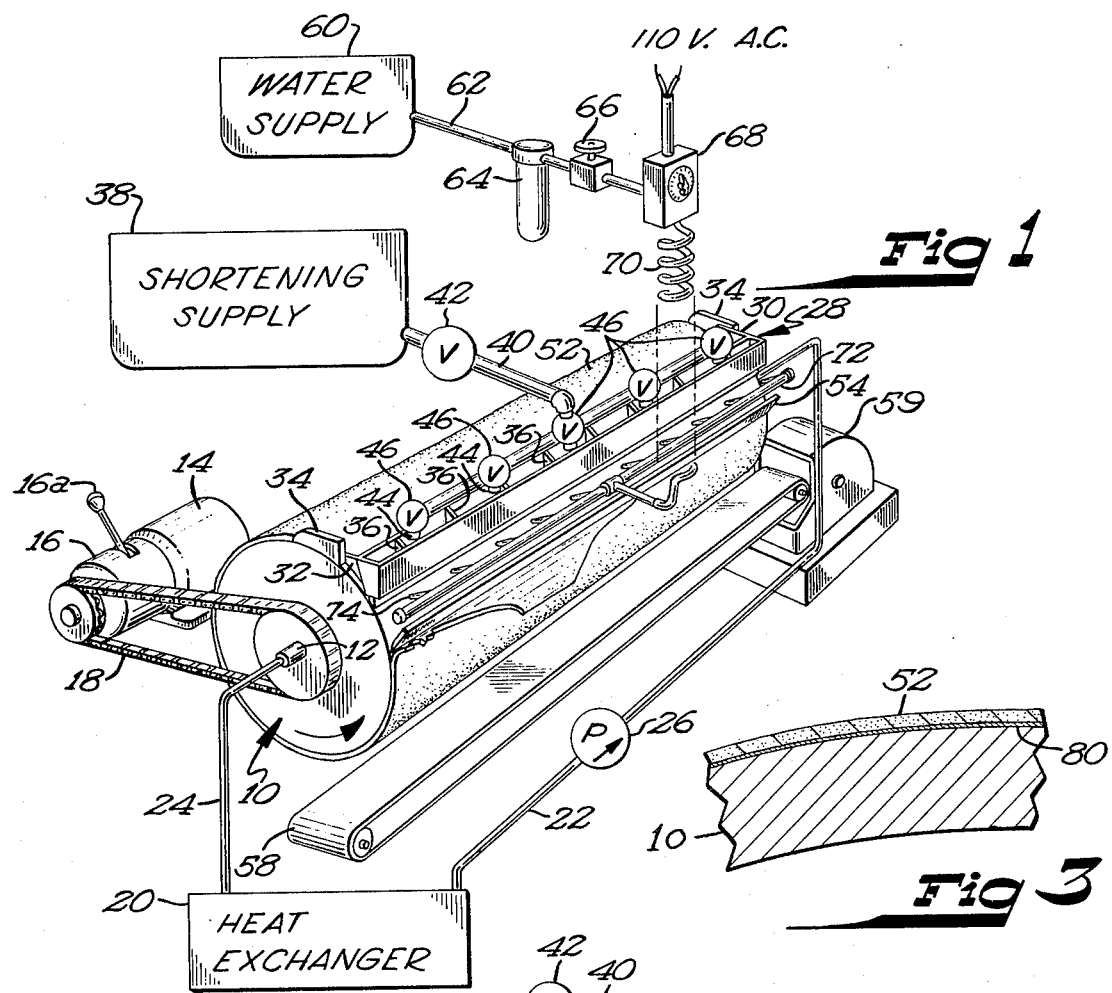
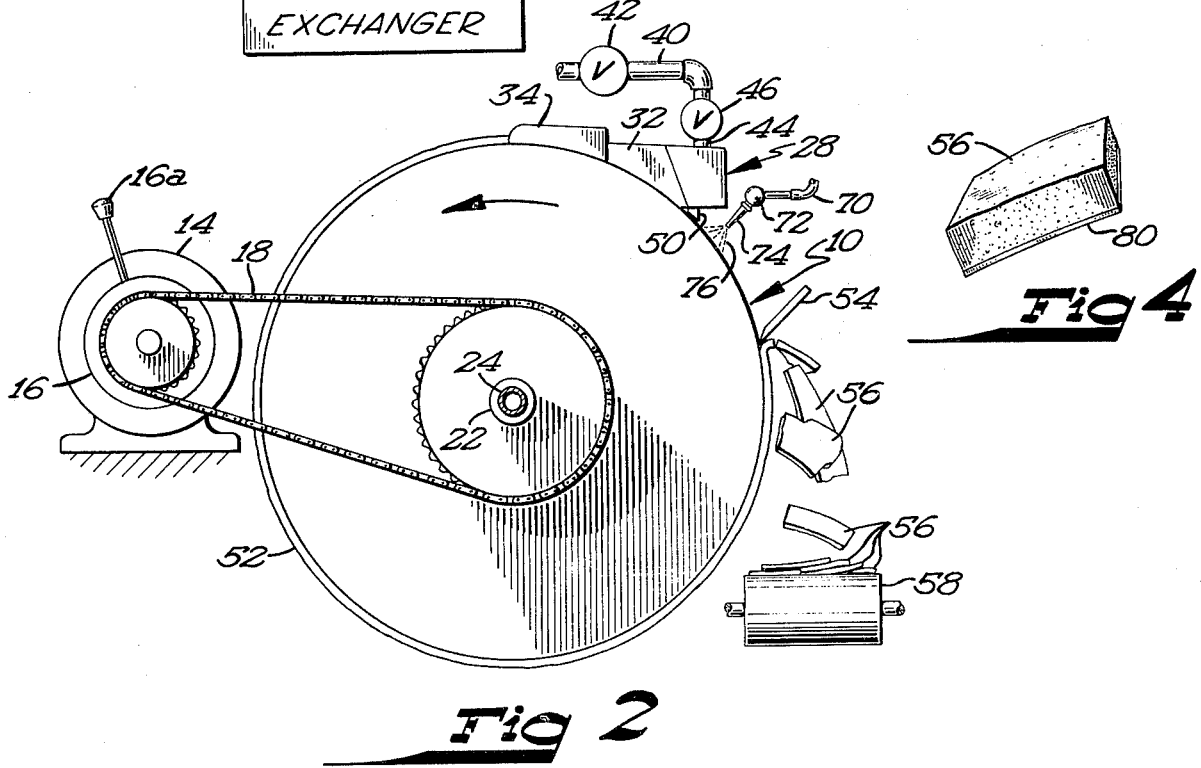

SHORTENING CHIP MANUFACTURE

FIELD OF THE INVENTION

The invention relates to the manufacture of shortening chips and more particularly to the manufacture of shortening chips by congealing a film of molten shortening on a chilled surface. The term "shortening" herein is used in a broad sense to include edible fatty based compositions such as butter, margarine and the like as well as pure fats with or without emulsifiers, colorants, flavors etc.

THE PRIOR ART

It has been known to prepare shortening chips by applying molten shortening continuously to the surface of a chilling element such as a continuously rotating chilling drum through which a coolant is pumped continuously. The shortening forms a congealed film on the outer surface of the drum which is then scraped from the drum by the doctor blade. One of the primary shortcomings of the prior process is the low rate of heat transfer through the surface of the drum. Accordingly, production rates were relatively low. Another problem was the adhesion of the congealed shortening to the surface of the drum which at times made it difficult to efficiently scrape the shortening from the drum. A further problem took place when the drum was allowed to stand overnight. On some of these occasions frost or ice formed on the surface of the drum. When the equipment was started up the next day, it often took from one to several hours to clear off the ice.

THE OBJECTS

The main objects of the invention are to provide an improved shortening chip production process wherein production rates are increased by at least about 40–46%, the congealed shortening releases more easily from the drum than heretofore, heat is transferred more effectively from the fat to the drum and startup time is drastically reduced, for example to an average maximum time of about 5 minutes.

SUMMARY OF THE INVENTION

Shortening chips such as lard chips or hydrogenated vegetable oil chips are prepared by melting the shortening and depositing it on a moving endless chilling surface held at a temperature below the cloud point of the applied shortening to congeal the shortening as a film thereon. After the shortening has congealed, it is removed preferably by means of a doctor blade. At a suitable location between the removal point at which the shortening is applied, water is applied to the surface of the chilling element to form a film. This water film is maintained at the point where the shortening is applied to the chilling surface so that as the chilling element is advanced, the water film becomes interposed between the freshly applied shortening and the chilling surface. It was discovered that the water film thus applied greatly facilitates the transfer of heat through the chilling surface and thereby greatly improves production rates. In addition, it aids in the release of the shortening from the chilling surface and drastically reduces start-up time when ice is condensed on the surface of the chilling element.

In a preferred form of the invention, the flow of water onto the surface of the drum is accurately and effectively controlled by applying it through spray nozzles at spaced apart time intervals. For example, assuming a plurality of nozzles are provided, the moisture can be applied in a typical case for ten seconds out of each two minute time period. The moisture should not be applied at such a high rate so that enough excess water accumulates to begin running off the surface of the drum. Instead only enough should remain on the surface to form a film interposed between the freshly applied shortening and the chilling surface. The chilling surface e.g. the cylindrical surface of a drum is advanced continuously during operation while the shortening is continuously applied at a selected point on the drum. The completely formed sheet of shortening is removed continuously at a selected point.

As the drum turns, its surface is wetted by the application of a water spray. In a preferred embodiment, the water spray is applied to the drum for only a brief period of time. When the spray strikes the drum a certain amount of water will accumulate where the drum surface disappears under the shortening applicator pan. When the accumulation of water begins to disappear and the surface of the drum is almost dry, the moisture is re-applied.

However, by applying the moisture at a very much reduced rate it is possible to apply the moisture continuously. When the moisture is applied continuously, very precise controls must be provided to regulate the rate of application and to maintain it at the proper level. Intermittant application has been found more practical because the spray can be applied through commercially available spray nozzles at ordinary pressures, but it is to be understood that continuous moisture application can be used when necessary or desirable. In a preferred form of the invention, water is applied through a hollow conical spray application. By applying water to the surface of the drum in accordance with the present invention, production speeds are very substantially increased.

During operation if the shortening is not solidified by the time it reaches the doctor blade, the drum is slowed down. On the other hand, if it is entirely solidified at that point, the drum may be speeded up somewhat until the maximum production rate is obtained.

THE FIGURES

FIG. 1 is a perspective view of the apparatus embodying the process of the invention, FIG. 2 is an end elevational view of the apparatus of FIG. 1, FIG. 3 is a partial sectional view of the surface of the drum of FIGS. 1 and 2, and FIG. 4 is an enlarged perspective view of a fat chip prepared in accordance with the invention.

DESCRIPTION OF A PREFERRED EMBODIMENT

Refer now to the drawings which illustrate one preferred form of the invention. As seen in FIGS. 1 and 2, a shortening congealing drum 10 is provided upon which a thin layer or film of shortening is cast continuously. The drum 10 is mounted for rotation upon a horizontal axel 12 and is driven by means of a motor 14 through a variable speed drive 16 and a chain and sprocket assembly 18 including sprockets on the variable speed drive 16 and drum 10. A cooling medium such as brine is supplied to the drum 10 at a temperature at about 0°F. from heat exchanger 20 via inlet and outlet lines 22 and 24 by pump 26. In general, the brine is kept at as low a temperature as possible with the particular heat exchanger being used. A temperature of about 0°F. is typical.

Mounted in a fixed position on the upper surface of the drum is a shortening applicator pan 28 having side walls 30, 32 with edge dams 34 and 36 which can be formed from any suitable material such as polytetraflouroethylene. The pan 28 is divided into a plurality of compartments by means of divider baffles 36. Heated shortening is supplied from tank 38 which is typically at a temperature of about 118°F. but in any event above the cloud point of the particular shortneing used.

The shortneing flows through a pipe 40 at a rate controlled by metering valve 42 to a plurality of longitudinally spaced outlets 44 each of which has a valve 46 to control the amount of shortening applied to each part of the pan to thereby maintain the shortening level along the length of the pan. The pan 28 is provided with an inlet wiper blade 50 having a lower edge which conforms to the surface of the drum and extends longitudinally along the length of the lower surface of the pan 28. The blade 50 can be rigidly fastened to the pan in any suitable manner and is preferably formed from a low friction material such as polytetraflouroethylene.

As the drum slowly rotates at a speed controlled by the motor 14 and variable speed control 16 in a counterclockwise direction as seen in the figures, a thin layer of shortening 52 is cast on its surface and becomes relatively brittle at the point where it is removed by means of a longitudinally extending doctor blade 54. The shortening sheets 56 falling from blade 54 drop onto a take-away conveyor 58 where they are transferred to a suitable breaker of any known construction such as a hammermill 59 that divides the sheets 56 up into small flake size pieces which may be from about an eighth to a quarter of an inch across. The shortening chips themselves have a typical thickness of about 0.026 inches to 0.040 thickness.

The water that is sprayed onto the drum flows from a source 60 through line 62 to a filter 64, flow control valve 66 and from a timer 68 through a flexible coiled hose 70 which is connected at its lower end to a manifold pipe 72 provided with a plurality of spaced spray nozzles 74 that expells the water when the timer 68 is on as a conical spray 76 onto the surface of the drum at a point adjacent the inlet or upstream end of the coating pan 28. The spray 76 can in general be applied at any point between doctor blade 54 and pan 28 but is preferably applied relatively close to the pan 28.

The temperature of the water supplied through the nozzles 74 is not regarded as critical. Successful operation has been obtained with tap water usually at a temperature of about 60°F. Assuming that the drum is approximately 4 feet in diameter and 9 feet long, with a stainless steel cylindrical wall ¾ of an inch thick, approximately 16 nozzles 6 inches apart are satisfactory. To prevent waste, the spray should be just sufficient to wet the drum surface without producing so much excess water that it begins to runoff. Intermittent spraying is the preferred method for applying the water to the drum surface at this relatively low rate. Excellent results have been achieved by spraying the water for about 10 seconds out of each two minutes with a 4 × 9 foot drum rotating at about 2–3 rmp. while producing about 2400 to about 2600 pounds of finished shortening chips per hour. The water is applied at a rate of about 1.5 gallons per hour when a drum of that size is used and chips are formed at the rate given. Any suitable spray nozzles can be used, but the best results have been achieved with atomizing spray nozzles that produce a hollow cone spray.

The temperature of the drum and the heated shortening can be measured by the operator using any satisfactory portable temperature measuring instrument such as an electrical pyrometer. The temperature of the shortening as it enters the applicator pan should be above its cloud point temperature. For a shortening used in making biscuits, 118°F. ± 3°F. is satisfactory in many cases. With higher melting point fats, a higher temperature will, of course, have to be used.

It will be understood the during operation, the fat will be pumped continuously into the applicator pan 28 and as the drum rotates the fat layer 52 will be formed continuously. At the same time the water should 76 will form a continuous film 80 beneath the fat layer 42. The water layer is probably only a few thousandths of an inch thick. The thin water film 80 on a typical chip 52, FIG. 4, cannot be seen with a naked eye but gives the chip a glazed lower surface. In the application for which the invention is now used, the drum 10 is driven at a speed between about 1 and 5 rpm. and preferably between about 1½ – 3 rpm. as controlled by the manual control lever 16a of the variable speed drive 16. The control of the operation as carried out by the operator will now be described.

At a given drum rotational speed, the rate of application of water by spray nozzles 74 is set to provide just sufficient moisture on the surface of the drum to completely cover the drum with a film at the point where the drum surface disappears under the pan 28. When a timer is used for this purpose, it can be set manually to operate for any given on-time desired. If it is noted that enough water is beginning to accumulate on the section of the drum between the pan and the blade 54 so that some of the water begins to run off, then the on-time should be reduced. After the operation is started in this manner, the speed of the drum is observed. If the drum speed is too high, the chips will be too thin. To increase the chip thickness, either the level of the shortening in the applicator pan 28 must be raised or the drum must be slowed. This is done with the manual control 16a.

The heat transfer from the fat to the drum is much better using the invention than when no water spray is provided. Accordingly, production speeds can be increased substantially with the same shortening as can be seen by the table below for four different kinds of shortening designated A, B, C and D.

TABLE I

PRODUCTION OF FAT CHIPS WITH AND WITHOUT WATER SPRAY PRIOR TO SHORTENING APPLICATION

|   | Without Water Spray | With Water Spray Applied in Accordance with invention | %Increase |
| --- | --- | --- | --- |
| A | 1660 lbs. per hour | 2404 lbs. per hour | 46% |
| B | 1829 lbs. per hour | 2566 lbs. per hour | 44% |
| C | 1708 lbs. per hour | 2425 lbs. per hour | 40% |

TABLE I-continued

PRODUCTION OF FAT CHIPS WITH AND WITHOUT WATER SPRAY PRIOR TO SHORTENING APPLICATION

| | Without Water Spray | With Water Spray Applied in Accordance with invention | %Increase |
|---|---|---|---|
| D | 1829 lbs. per hour | 2566 lbs. per hour | 40% |

The invention has other benefits, particularly the reduction of start-up time when frost and ice has formed on the surface of the drum during periods when it is not used.

What is claimed is:

1. A process for preparing edible shortening chips for food use comprising depositing the shortening in a molten state upon an endless chilling surface which is held at a temperature below the cloud point of the shortening for the purpose of congealing the shortening as a film on the chilling surface, continuously advancing the endless chilling surface to thereby continuously form a film of the shortening on the surface thereof, continuously removing the thus formed film of shortening from the chilling surface and between the point at which the shortening is removed and the point at which the shortening is applied, applying water to the chilling surface to thereby cause the accumulation of a water film of the endless chilling surface where the chilling surface disappears under the deposited shortening and maintaining the applied water film in the location at which the shortening layer is applied to thereby provide a water layer interposed between the freshly applied shortening and the chilling surface.

2. The process of claim 1 wherein the chilling surface comprises a hollow drum filled with a coolant, the coolant is circulated continuously through the drum and the drum is rotated at a speed between about 1 and 5 rpm.

3. The process of claim 1 wherein the water is applied to the drum by a spray application to the surface thereof.

4. The process of claim 3 wherein the water spray is applied to the drum intermittently.

5. The process of claim 1 wherein the water is applied to the surface of the drum adjacent to and upstream from the point at which the shortening is applied thereto and the water spray is applied in a plurality of spaced apart hollow conical spray streams.

6. The process of claim 1 wherein the chilling surface comprises a hollow drum connected to a source of a cooling liquid, the cooling liquid is refrigerated and pumped through the drum, the drum is rotated between about 1 and 5 rpm., the shortening film cast on the surface of the drum is removed continuously from the drum in sheet form and the sheets are thereafter broken into flake size pieces.

7. The process according to claim 6 wherein the coolant is refrigerated to a temperature below the freezing point of water.

8. The process of claim 6 wherein the shortening is fed to the drum at a plurality of spaced apart points longitudinally of the drum to thereby distribute the heated shortening evenly along the length of the drum.

* * * * *

UNITED STATES PATENT OFFICE
CERTIFICATE OF CORRECTION

Patent No. 3,950,561　　　　　　　　　　Dated April 13, 1976

Inventor(s) Donald M. Collins

It is certified that error appears in the above-identified patent and that said Letters Patent are hereby corrected as shown below:

Column 5, line 29, "of" should read -- on --.

Signed and Sealed this twenty-second Day of June 1976

[SEAL]

Attest:

RUTH C. MASON
Attesting Officer

C. MARSHALL DANN
Commissioner of Patents and Trademarks